(12) United States Patent
Aso

(10) Patent No.: US 9,783,043 B2
(45) Date of Patent: Oct. 10, 2017

(54) FUEL TANK STRUCTURE

(71) Applicant: TOYOTA JIDOSHA KABUSHIKI KAISHA, Toyota-shi, Aichi-ken (JP)

(72) Inventor: Shuichi Aso, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/170,305

(22) Filed: Jun. 1, 2016

(65) Prior Publication Data

US 2017/0008394 A1 Jan. 12, 2017

(30) Foreign Application Priority Data

Jul. 8, 2015 (JP) .................................. 2015-136996

(51) Int. Cl.
*B60K 15/077* (2006.01)
*B60K 15/03* (2006.01)
*G01M 3/04* (2006.01)

(52) U.S. Cl.
CPC ........ *B60K 15/03* (2013.01); *B60K 15/03006* (2013.01); *B60K 15/077* (2013.01); *G01M 3/04* (2013.01); *B60K 2015/03105* (2013.01); *B60Y 2306/15* (2013.01)

(58) Field of Classification Search
CPC .......... B60K 15/03; B60K 2015/03085; B60K 2015/0321; B60K 15/077; B60K 15/03006; G01M 3/04
See application file for complete search history.

(56) References Cited

U.S. PATENT DOCUMENTS

| 4,524,609 | A | * | 6/1985 | Sharp | B65D 90/503 220/723 |
|---|---|---|---|---|---|
| 5,184,504 | A | * | 2/1993 | Spring | G01M 3/32 73/49.2 |
| 5,596,971 | A |  | 1/1997 | Kidokoro |  |
| 5,979,417 | A | * | 11/1999 | Hyodo et al. | B60K 15/03 123/516 |
| 6,176,118 | B1 | * | 1/2001 | Kidokoro et al. | B60K 15/03 73/40 |
| 6,389,893 | B1 | * | 5/2002 | Kobayashi | B60K 15/077 73/290 B |
| 2015/0151629 | A1 | * | 6/2015 | Ooiwa | B60K 15/03006 220/562 |
| 2016/0368374 | A1 | * | 12/2016 | Aso | B60K 15/03 |

FOREIGN PATENT DOCUMENTS

JP H08-170568 A 7/1996

\* cited by examiner

*Primary Examiner* — Kevin Lee
(74) *Attorney, Agent, or Firm* — Oliff PLC

(57) ABSTRACT

There is provided a fuel tank structure, the fuel tank structure including (1) a bag-shaped member that partitions a space within a fuel tank into a first space at an outer side and a second space at an inner side, (2) a first pressure sensor that senses pressure of the first space, (3) a second pressure sensor that senses pressure of the second space, (4) a pump that reduces pressure of the first space, and (5) a control section that, in a case in which the pressure of the first space is higher than a first threshold value, judges that a hole has formed in the fuel tank, and, in a case in which the pressure of the second space is lower than a second threshold value, judges that a hole has formed in the bag-shaped member.

2 Claims, 9 Drawing Sheets

FUEL TANK STRUCTURE

CROSS-REFERENCE TO RELATED APPLICATION

This application claims priority under 35 USC 119 from Japanese Patent Application No. 2015-136996 filed Jul. 8, 2015, the disclosure of which is incorporated by reference herein.

BACKGROUND

Technical Field

The present disclosure relates to a fuel tank structure.

Related Art

A fuel tank structure, in which an expanding/contracting film that is bag-shaped (a bag-shaped member) and that can inflate and contract is provided within a fuel tank, is disclosed in Japanese Patent Application Laid-Open (JP-A) No. H8-170568 as a fuel tank structure that is installed in an automobile. Further, this JP-A No. H8-170568 discloses at technique of suppressing the generation of evaporated fuel from the liquid surface of fuel by inflating or contracting the expanding/contracting, film so as to cover the liquid surface of the fuel.

However, in the fuel tank structure disclosed in JP-A No. H8-170568, perforation of the fuel tank cannot be detected. Therefore, there is room for improvement from the standpoint of detecting perforation of the fuel tank.

SUMMARY

The present disclosure provides a fuel tank structure that can detect perforation of a fuel tank, while suppressing the generation of evaporated fuel.

A first aspect of the present disclosure includes a fuel tank that is installed in an automobile and that accommodates fuel, a bag-shaped member that is fixed to a ceiling portion of an interior of the fuel tank, and that partitions a space within the fuel tank into a first space at an outer side of the bag-shaped member and a second space at an inner side of the bag-shaped member, and that, by inflating or contracting in accordance with a height of a liquid surface of fuel accommodated in the fuel tank, maintains a state of contact with the fuel, a first pressure sensor that senses pressure of the first space, a second pressure sensor that senses pressure of the second space, a pump that reduces pressure of the first space, and a control section that operates the pump, and acquires the pressure of the first space sensed by the first pressure sensor and the pressure of the second space sensed by the second pressure sensor after a predetermined time has elapsed from operating of the pump, and, in a case in which the pressure of the first space is higher than a first threshold value, judges that a hole has formed in the fuel tank, and, in a case in which the pressure of the second space is lower than a second threshold value, judges that a hole has formed in the bag-shaped member.

In the fuel tank structure relating to the above-described first aspect, the bag-shaped member is fixed to the ceiling portion of the fuel tank interior, and the space within the fuel tank is partitioned by the bag-shaped member into the first space, that is at the outer side of the bag-shaped member, and the second space, that is at the inner side of the bag-shaped member. Here, the bag-shaped member inflates or contracts in accordance with the height of the liquid surface of the fuel, and maintains a state of contact with the fuel. Due thereto, the liquid surface of the fuel can be covered by the bag-shaped member, regardless of the height of the liquid surface of the fuel. Namely, generation of evaporated fuel can be suppressed.

Further, the fuel tank structure has the control section that judges that a hole has formed in the fuel tank. The control section operates the pump, and acquires the pressure of the first space that is a predetermined time after the start of the reducing of the pressure of the first space. Then, on the basis of this pressure, the control section detects perforation of the fuel tank. Namely, in a case in which a hole has not formed in the fuel tank (a normal case), when the pump is operated, the pressure of the first space is reduced, and therefore, after a predetermined time, the pressure of the first space that is sensed by the first pressure sensor becomes lower than the first threshold value. In contrast, in a case in which a hole has formed in the fuel tank (an abnormal case), a gas flows into the fuel tank from the exterior via the hole, and therefore, even if the pump is operated, the pressure does not fall to the first threshold value. Namely, the pressure of the first space that is sensed by the first pressure sensor is higher than the first threshold value. In this way, perforation of the fuel tank can be detected.

Moreover, the control section operates the pump, and acquires the pressure of the second space that is a predetermined time after the start of the reducing of the pressure of the first space. Then, on the basis of this pressure, the control section detects perforation of the bag-shaped member. Namely, in a case in which a hole has not formed in the bag-shaped member (a normal case), even if the pump is operated, the pressure of the second space is not reduced, and therefore, the pressure of the second space does not fluctuate greatly. In contrast, in a case in which a hole has formed in the bag-shaped member, when the pump is operated and the pressure of the first space is reduced, a gas flows from the second space into the first space via the hole in the bag-shaped member. Due thereto, the pressure of the second space that is sensed by the second pressure sensor becomes lower than the second threshold value, and perforation of the bag-shaped member can be detected.

A second aspect of the present disclosure includes a warning device that warns a vehicle occupant that a hole has formed in at least one of the fuel tank and the bag-shaped member, wherein, in a case in which the pressure of the first space is higher than the first threshold value, the control section causes the warning device to warn the vehicle occupant that a hole has formed in the fuel tank, and, in a case in which the pressure of the second space is lower than the second threshold value, the control section causes the warning device to warn the vehicle occupant that a hole has formed in the bag-shaped member.

In the fuel tank structure relating to the above-described second aspect, the vehicle occupant can be notified, by a warning from the warning device, whether a hole has formed in the fuel tank or whether a hole has formed in the bag-shaped member.

As described above, in accordance with the fuel tank structure of the above-described first aspect, perforation of a fuel tank and perforation of a bag-shaped member can be sensed, while the generating of evaporated fuel is suppressed.

In accordance with the fuel tank structure of the above-described second aspect, a vehicle occupant can easily specify the place of a perforation.

BRIEF DESCRIPTION OF THE DRAWINGS

Exemplary embodiments of the present disclosure will be described in detail based on the following figures, wherein.

DETAILED DESCRIPTION

A fuel tank structure relating to an embodiment is described hereinafter. Note that arrow UP that is shown appropriately in the respective drawings indicates the upper side of a fuel tank. Further, in the present embodiment, the upper side of the fuel tank and the upper side in the vehicle vertical direction coincide with one another.

Figure 1:
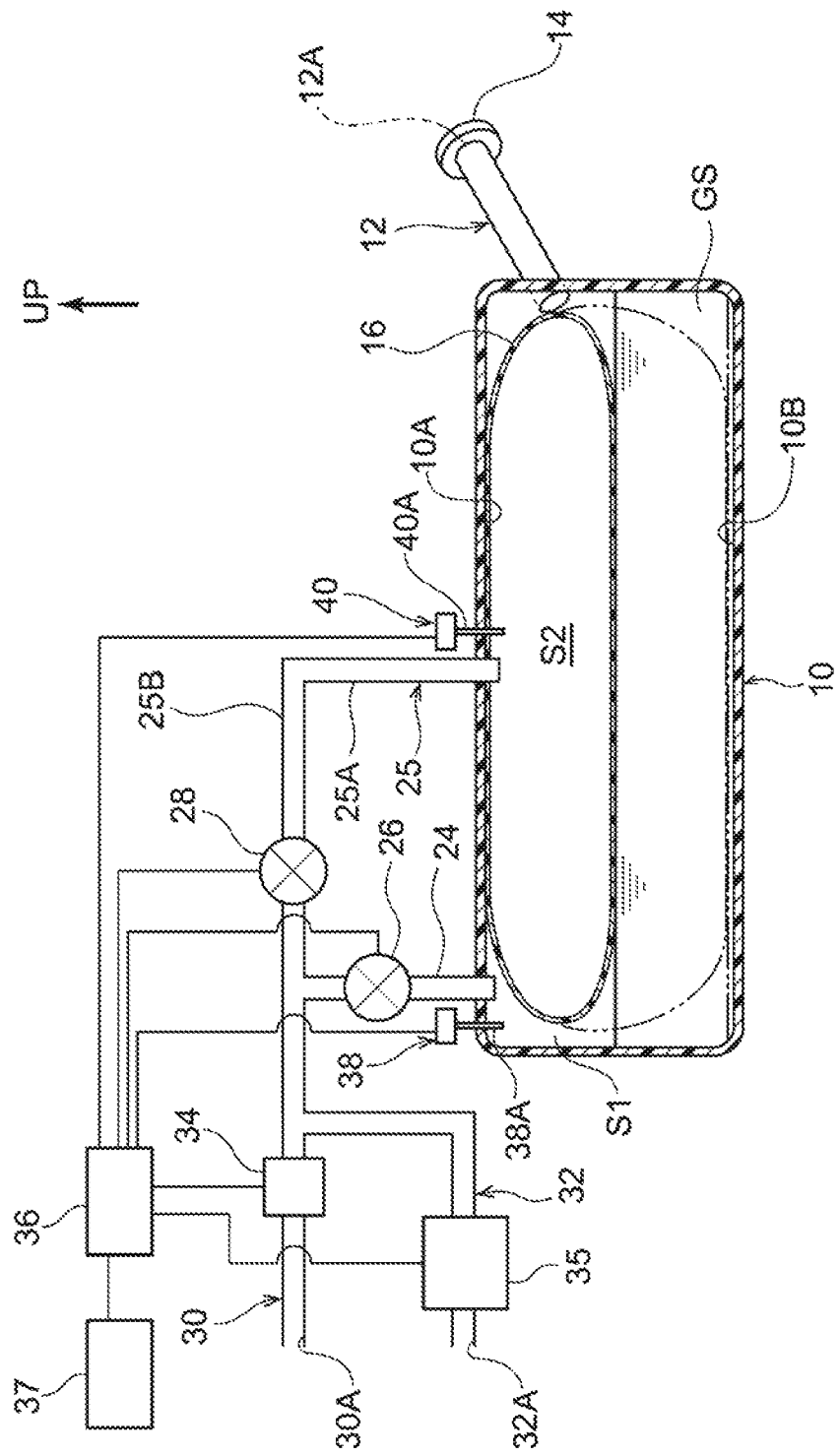
FIG. 1 is a drawing that schematically shows a fuel tank structure relating to an embodiment, and is a drawing showing a state before perforation detection is carried out.

As shown in FIG. 1, a fuel tank 10, that structures the fuel tank structure relating to the present embodiment, is formed in a hollow shape, and is formed in a shape (e.g., the shape of a substantially parallelepiped box) that can accommodate liquid fuel (hereinafter called "fuel GS") in the interior thereof. Further, the lower surface of the fuel tank 10 is supported by an unillustrated tank band. The fuel tank 10 is mounted to an unillustrated floor panel due to this tank hand being fixed to the floor panel via brackets or the like.

A filler pipe 12 that is substantially tubular is connected to the fuel tank 10. A refueling port 12A is formed in the upper end portion of the filler pipe 12. Refueling is carried out due to a refueling gun being inserted into this refueling port 12A and the fuel GS being filled into the fuel tank 10. Note that, in a case in which there is a large amount of the fuel GS within the fuel tank 10, some of the fuel GS is accommodated in the filler pipe 12 as well.

The refueling port 12A at the upper end of the filler pipe 12 is opened and closed by a fuel cap 14. An unillustrated fuel lid, that is provided at a side panel or the like of the vehicle body, is disposed at the outer side of the fuel cap 14.

In the closed state, the fuel cap 14 closes-off the refueling port 12A, and limits access of a refueling gun to the filler pipe 12. In contrast, when the fuel cap 14 is opened, the refueling port 12A of the filler pipe 12 is opened, and access of a refueling gun to the refueling path is possible.

A bag-shaped member 16 is provided at the vehicle upper side of the fuel tank 10 interior. The bag-shaped member 16 is formed of as resin material that is inflatable and contractible, and is fixed to a ceiling portion 10A of the fuel tank 10. Further, the space at the fuel tank 10 interior is partitioned into a first space S1 and a second space S2 by the bag-shaped member 16. The first space S1 is the space at the outer side of the bag-shaped member 16 (the space surrounded by the fuel tank 10 and the bag-shaped member 16), and here, indicates the space that is further upward than the liquid surface of the fuel GS. The second space S2 is the space at the inner side of the bag-shaped member 16. Note that "inflatable and contractible" here is not limited to a structure in which the bag-shaped member 16 itself expands and contracts, and includes members that are bag-shaped and whose volumes are variable such that they contract by being folded-up and inflate by being unfolded.

A discharge pipe 24, that is for discharging the gas (air) that is within the first space S1, is connected to the ceiling portion 10A of the fuel tank 10. The discharge pipe 24 is disposed in a vicinity of a side wall of the fuel tank 10. One end of the discharge pipe 24 is disposed within the fuel tank 10 and communicates with the first space S1. The other end of the discharge pipe 24 extends to the upper side in the vertical direction of the fuel tank 10, and is connected to a discharge-side valve 26. Further, the discharge pipe 24 extends further upward from the discharge-side valve 26, and is connected to a lateral pipe portion 25B of an introducing pipe 25 that is described hereinafter.

The introducing pipe 25, that is for introducing a gas (air) into the bag-shaped member 16, is connected to the ceiling portion 10A of the fuel tank 10. The introducing pipe 25 is disposed at the central portion of the fuel tank 10 as seen in plan view, and is structured to include a vertical pipe portion 25A that extends in the vertical direction of the fuel tank 10, and the lateral pipe portion 25B that extends in a direction intersecting the vertical pipe portion 25A. One end of the vertical pipe portion 25A is disposed within the fuel tank 10 and communicates with the internal space of the bag-shaped member 16 (the second space S2). The other end of the vertical pipe portion 25A is connected to the lateral pipe portion 25B.

The lateral pipe portion 25B extends from the other end of the vertical pipe portion 25A in a direction intersecting the vertical pipe portion 25A, and is connected to an introduction-side valve 28. The lateral pipe portion 25B extends further from the introduction-side valve 28, and branches-off into a pipe 30 for opening to the atmosphere and an air supply pipe 32. A pump 34 for discharging the gas is connected to the pipe 30 for opening to the atmosphere the present embodiment, as an example, a pump whose pressure-reducing ability is 1.5 kPa to 2.0 kPa is used. Further, an opening 30A that opens to the atmosphere is formed at the end portion of the pipe 30 for opening to the atmosphere.

On the other hand, a compressor 35 is connected to the air supply pipe 32. Due to compressed air being sent from the compressor 35 to the bag-shaped member 16, the pressure of the second space S2 at the interior of the bag-shaped member 16 becomes about 1 kPa higher than atmospheric pressure. Further, an opening 32A that opens to the atmosphere is formed at the end portion of the air supply pipe 32. Moreover, the discharge-side valve 26, the introduction-side valve 28, the pump 34 and the compressor 35 are electrically connected to an ECU (Electronic Control Unit) 36 that serves as a control section.

Here, due to the ECU 36 controlling the discharge-side valve 26, the introduction-side valve 28 and the compressor 35, the ECU 36 inflates or contracts the bag-shaped member 16 in accordance with the height of the liquid surface of the fuel GS that is accommodated in the fuel tank 10. Specifically, due to a signal from the ECU 36, the introduction-side valve 28 is opened and the discharge-side valve 26 is closed. Then, as shown by the two-dot chain line of FIG. 1, in a case in which the amount of the fuel GS decreases and the height of the liquid surface falls, the bag-shaped member 16 inflates and the state of contact with the liquid surface of the fuel GS is maintained, because the pressure of the second space S2 at the interior of the bag-shaped member 16 is higher than the pressure of the first space S1. Further, due to a signal from the ECU 36, the compressor 35 is operated, and compressed air is introduced into the bag-shaped member 16 via the air supply pipe 32 and the introducing pipe 25. Due thereto, the pressure of the second space S2 can be maintained even in a case in which the bag-shaped member 16 is inflated.

On the other hand, in a case in which the liquid surface rises due to the amount of the fuel GS increasing due to refueling or the like, accompanying the rise in the liquid surface, the air that is within the second space S2 at the interior of the bag-shaped member 16 is pushed-out to the introducing pipe 25 side. Due thereto, the bag-shaped member 16 contracts, and the state of contact of the bag-shaped member 16 and the liquid surface of the fuel GS is maintained.

A first pressure sensor 38 and a second pressure sensor 40 are provided in a vicinity of the ceiling portion 10A of the fuel tank 10. The first pressure sensor 38 is disposed in a vicinity of the discharge pipe 24. The first pressure sensor 38 has a detector 38A that passes-through the ceiling portion 10A and extends to the first space S1, and the first pressure sensor 38 is structured so as to be able to sense the pressure of the first space S1. On the other hand, the second pressure sensor 40 is disposed in a vicinity of the introducing pipe 25. The second pressure sensor 40 has a detector 40A that passes-through the ceiling portion 10A and extends to the second space S2, and the second pressure sensor 40 is structured so as to be able to sense the pressure of the second space S2.

Here, the first pressure sensor 38 and the second pressure sensor 40 are electrically connected to the ECU 36. Further, perforation of the fuel tank 10 and the bag-shaped member 16 is detected by the ECU 36 acquiring the pressure of the first space S1, that is sensed by the first pressure sensor 38, and the pressure of the second space S2, that is sensed by the second pressure sensor 40. The method of detecting perforation is described later.

The ECU 36 is electrically connected to a warning device 37. The warning device 37 is a device that warns a vehicle occupant in a case in which the state of the fuel tank 10 is abnormal, and has a buzzer, a speaker, a lamp, a vibrator, a display, or the like. In a case in which a hole has formed in the fuel tank 10 and/or the bag-shaped member 16, the warning device 37 informs the vehicle occupant of the abnormality by issuing a warning sound, causing a lamp to flash on and off, or displaying a warning on a display or the like provided at the instrument panel at the front portion of the vehicle cabin.

The method of detecting perforation by the ECU 36 is described hereinafter. Note that FIGS. 2 to 5 show that the discharge-side valve 26 is in an open state by illustrating the discharge-side valve 26 in white. Further, perforation detection is carried out in a state in which the fuel tank 10 is stable, such as at a time when the vehicle is stopped or the like.

(A Case in which Holes have not Formed in the Fuel Tank and the Bag-Shaped Member)

Figure 2:
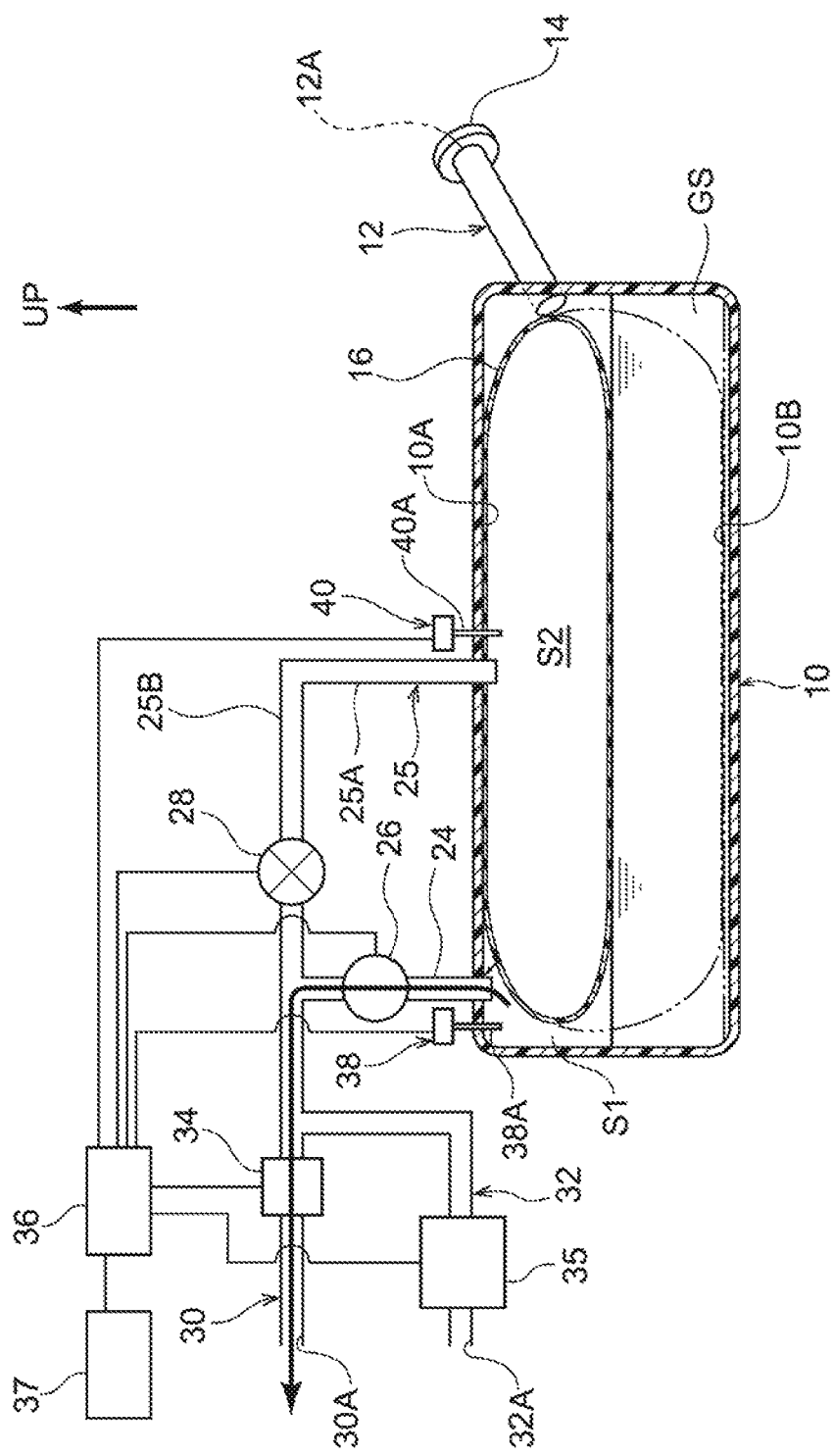
FIG. 2 is a drawing that corresponds to FIG. 1 and shows a state at the time of perforation detection in a normal case in which holes have not formed in a fuel tank and a bag-shaped member.

First, a case (a normal case) in which holes have not formed in the fuel tank 10 and the bag-shaped member 16 is described. As shown in FIG. 2, at the time of perforation detection that detects perforation of the fuel tank 10 and the bag-shaped member 16, the introduction-side valve 28 is closed by a signal from the ECU 36. Due thereto, the internal space of the bag-shaped member 16 (the second space S2) is sealed.

After the ECU 36 closes the introduction-side valve 28, the ECU 36 operates the pump 34 and opens the discharge-side valve 26. Due thereto, as shown by the arrow in FIG. 2, the air within the first space S1 passes-through the discharge pipe 24, the lateral pipe portion 25B and the pipe 30 for opening to the atmosphere, and is discharged-out into the atmosphere from the opening 30A. Namely, the pressure of the first space S1 is reduced.

Further, the ECU 36 acquires the pressure of the first space S1, that is sensed by the first pressure sensor 38, and the pressure of the second space S2, that is sensed by the second pressure sensor 40. Further, after a predetermined time passes from the start of the discharging of the air that is within the first space S1 by the pump 34, the ECU 36 stops the pump 34 and closes the discharge-side valve 26. Here, the ECU 36 judges whether holes have formed in the fuel tank 10 and the bag-shaped member 16, on the basis of the pressure of the first space S1 and the pressure of the second space S2 that are acquired after the predetermined time has passed. Note that, in the present embodiment, the ECU 36 acquires the pressure of the first space S1 and the pressure of the second space S2 two minutes after the start of the reducing of the pressure of the first space S1 by the pump 34, and, on the basis of these pressures, judges perforation.

Figure 6:
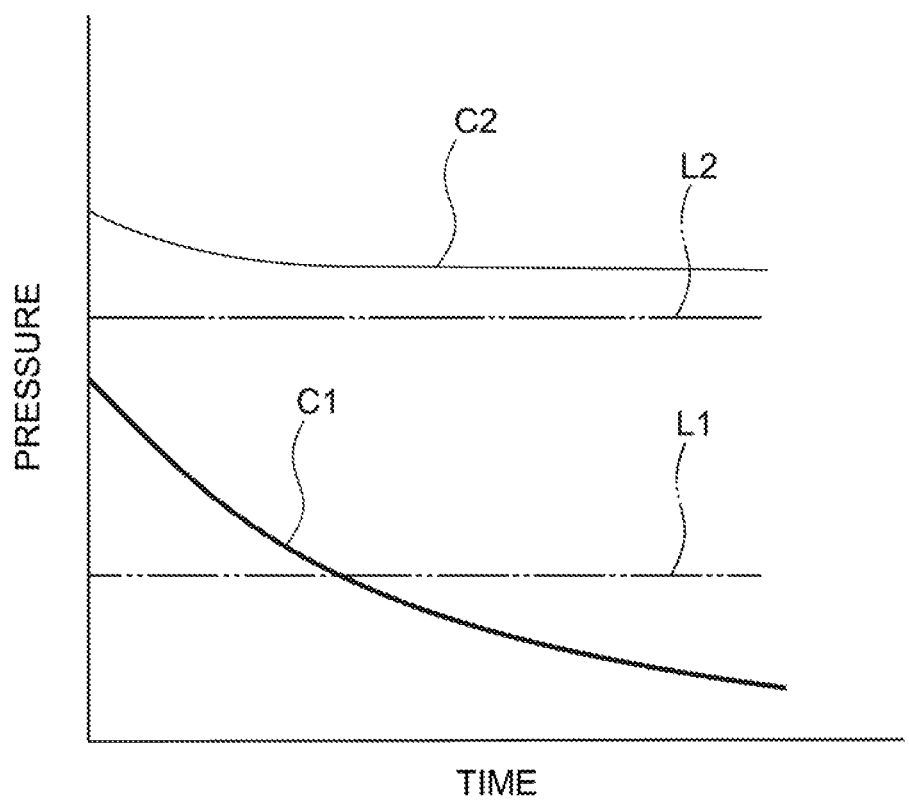
FIG. 6 is a graph showing changes in pressures of a first space and a second space that are sensed by a first pressure sensor and a second pressure sensor in the state of FIG. 2.

Changes in the pressure of the first space S1 that is sensed by the first pressure sensor 38 and changes in the pressure of the second space S2 that is sensed by the second pressure sensor 40, in a normal case, are shown in FIG. 6. Here, the vertical axis is pressure, and the horizontal axis is time. Further, curve C1 shows the pressure of the first space S1 that is sensed by the first pressure sensor 38 from the start of the discharging of the air that is within the first space S1 until the predetermined time (two minutes) elapses. Curve C2 shows the pressure of the second space S2 that is sensed by the second pressure sensor 40 from the start of the discharging of the air that is within the first space S1 until the predetermined time (two minutes) elapses.

Here, threshold value L1 that is the two-dot chain line shows the upper limit of the normal range of pressures sensed by the first pressure sensor 38. Therefore, in a case in which, two minutes after the start of the reducing of the pressure of the first space S1, the pressure C1 of the first space is higher than the first threshold value L1, it is judged that this is an abnormal value. On the other hand, second threshold value L2 that is the two-dot chain line shows the lower limit of the normal range of pressures sensed by the second pressure sensor 40. Therefore, in a case in which, the predetermined time of two minutes after the start of the reducing of the pressure of the first space S1, the pressure C2 of the second space is lower than the second threshold value L2, it is judged that this is an abnormal value. The same holds for FIG. 7 through FIG. 9 as well.

Looking at FIG. 6, because the pressure of the first space S1 is reduced by the pump 34, the pressure C1 of the first space S1 falls together with the passage of time. Further, the pressure C1, that is two minutes after the start of the reducing of the pressure of the first space S1, is in a normal range that is lower than the first threshold value L1 that is the upper limit. On the other hand, the pressure C2 of the second space S2 fills slightly from the start of the discharging of the air that is within the first space S1 by the pump 34. This is because, due to the pressure of the first space S1 being reduced, the pressure of the second space S2 at the interior of the bag-shaped member 16 becomes relatively high, and the bag-shaped member 16 inflates. Further, the pressure C2, that is two minutes after the start of the reducing of the pressure of the first space S1, is in the normal range that is higher than the second threshold value L2. Therefore, the ECU 36 judges that there is a normal state in which no holes have formed in the first tank 10 and the bag-shaped member 16.

(A Case in which a Hole has Formed in the Fuel Tank)

Figure 3:
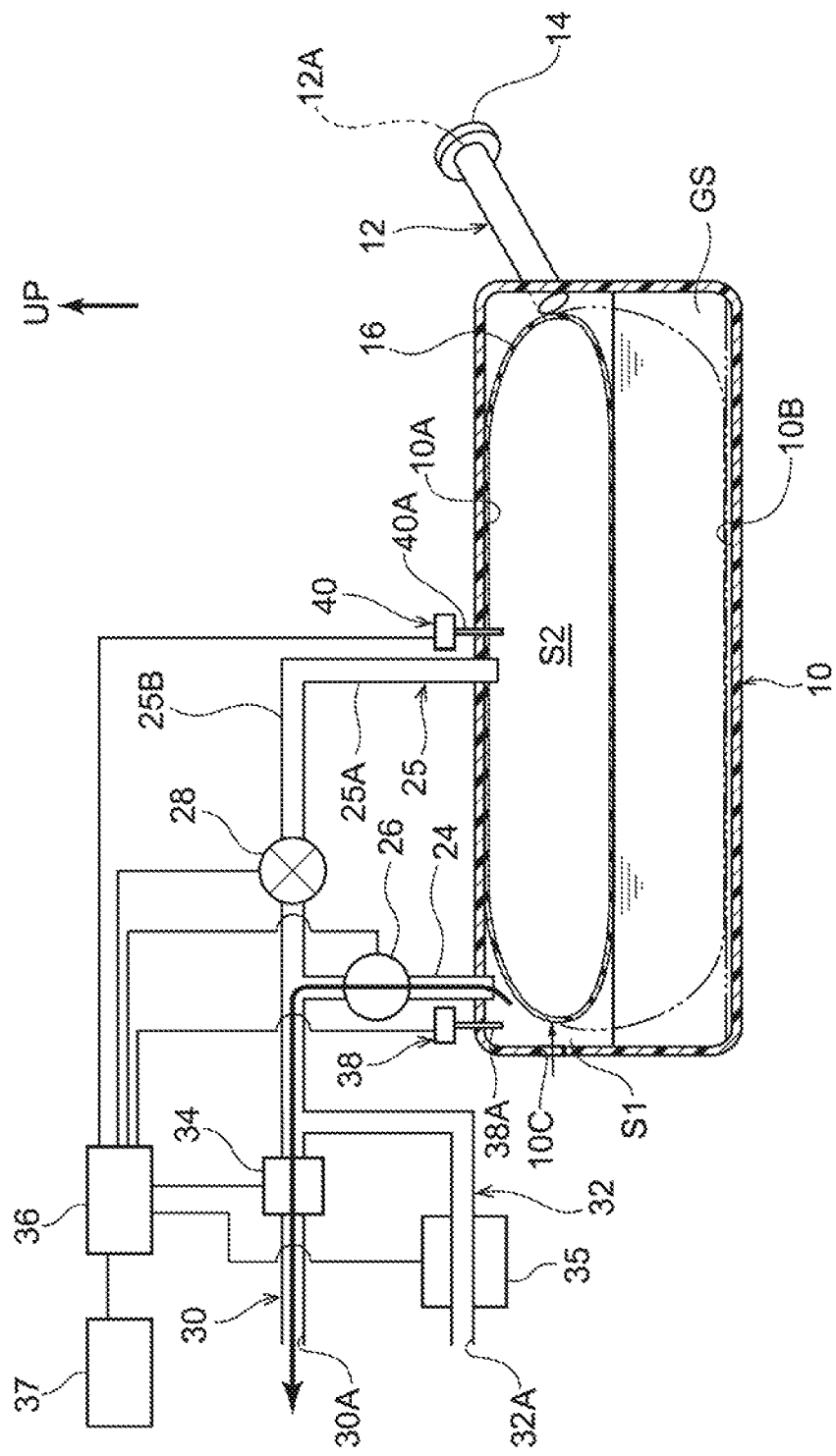
FIG. 3 is a drawing that corresponds to FIG. 1 and shows a state at the time of perforation detection in an abnormal case in which a hole has formed in the fuel tank.

A case (an abnormal case) in which a hole has formed in the fuel tank 10 is described next. As shown in FIG. 3, hole 10C has formed in a side wall of the fuel tank 10. Therefore, the first space S1 communicates with the exterior of the fuel tank 10 via the hole 10C.

Here, in the same way as in the above-described processes, the ECU 36 operates the pump 34 and opens the discharge-side valve 26. Due thereto, as shown by the arrow in FIG. 3, air within the first space S1 passes-through the discharge pipe 24, the lateral pipe portion 25B and the pipe 30 for opening to the atmosphere, and is discharged-out into the atmosphere from the opening 30A.

Further, the ECU 36 causes the first pressure sensor 38 to sense the pressure of the first space S1, and causes the second pressure sensor 40 to sense the pressure of the second space S2. Further, after a predetermined time (two minutes) has elapsed from the start of the reducing of the pressure of the first space S1 by the pump 34, the pump 34 is stopped and the discharge-side valve 26 is closed on the basis of signals from the ECU 36.

Figure 7:
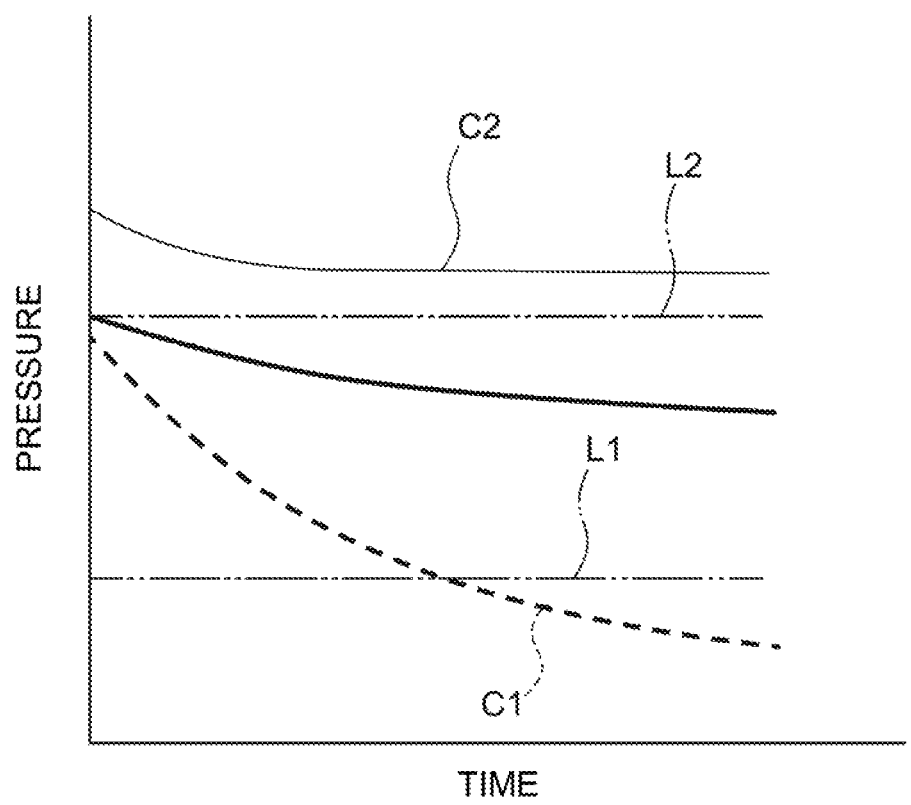
FIG. 7 is a graph showing changes in pressures of the first space and the second space that are sensed by the first pressure sensor and the second pressure sensor in the state of FIG. 3.

The pressure C1 of the first space S1 and the pressure C2 of the second space S2 that were sensed in the state of FIG. 3 are shown in FIG. 7. Here, the pressure C2, that is two minutes after the start of the reducing of the pressure of the first space S1, is in the normal range that is higher than the second threshold value L2. On the other hand, due to pressure reduction by the pump 34, the pressure C1 (the solid line) of the first space S1 falls together with the passage of time, but air flows into the first space S1 from the exterior of the fuel tank 10 via the hole 10C, and therefore, the pressure C1 is maintained at a pressure that is higher than a normal case (which is the curve C1 shown by the dashed line in the drawing). Namely, there is saturation at a pressure at which the pressure-reducing ability of the pump 34 and the amount of air that flows-into the first space S1 are in equilibrium, and the pressure no longer falls thereafter. Further, the pressure C1 after two minutes is an abnormal value that is higher than the first threshold value L1 that is the upper limit. Therefore, the ECU 36 judges that the hole 10C has formed in the fuel tank 10. Further, by the warning device 37, the ECU 36 informs the vehicle occupant that the hole 10C has formed in the fuel tank 10, by display or a warning sound.

(A Case in which a Hole has Formed in the Bag-Shaped Member)

Figure 4:
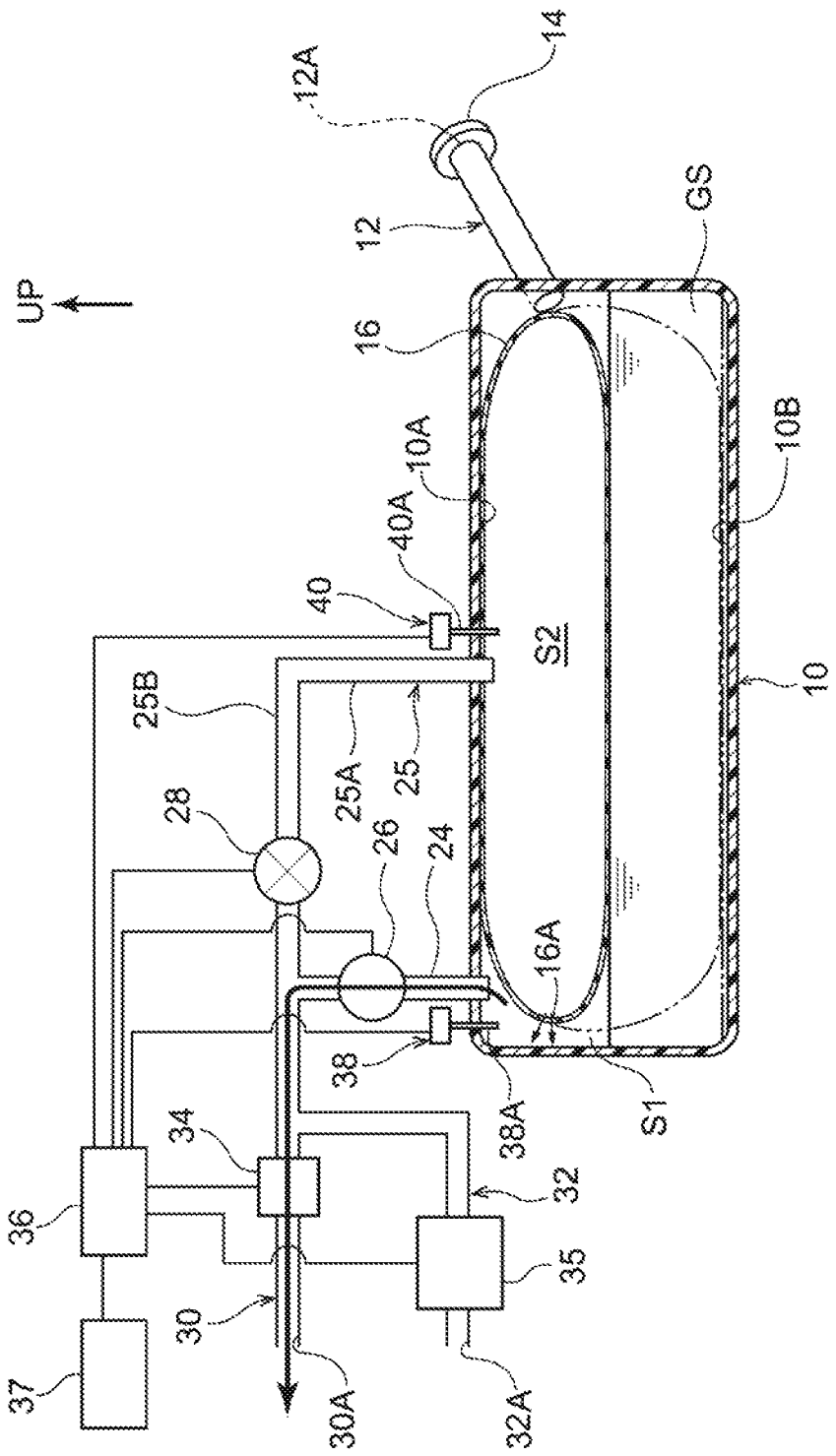
FIG. 4 is a drawing that corresponds to FIG. 1 and shows a state at the time of perforation detection in an abnormal case in which a hole has formed in the bag-shaped member.

A case (an abnormal case) in which a hole has formed in the bag-shaped member 16 is described next. As shown in FIG. 4, hole 16A has formed in the bag-shaped member 16. Therefore, the second space S2 communicates with the first space S1 via the hole 16A.

Here, in the same way as in the above-described processes, the ECU 36 operates the pump 34 and opens the discharge-side valve 26. Due thereto, as shown by the arrow in FIG. 4, air that is within the first space S1 passes-through the discharge pipe 24, the lateral pipe portion 25B and the pipe 30 for opening to the atmosphere, and is discharged-out into the atmosphere from the opening 30A.

Further, the ECU 36 causes the first pressure sensor 38 to sense the pressure of the first space S1, and causes the second pressure sensor 40 to sense the pressure of the second space S2. Further, after the predetermined time (two minutes) has elapsed from the start of the reducing of the pressure of the first space S1 by the pump 34, the pump 34 is stopped and the discharge-side valve 26 is closed on the basis of signals from the ECU 36.

Figure 8:
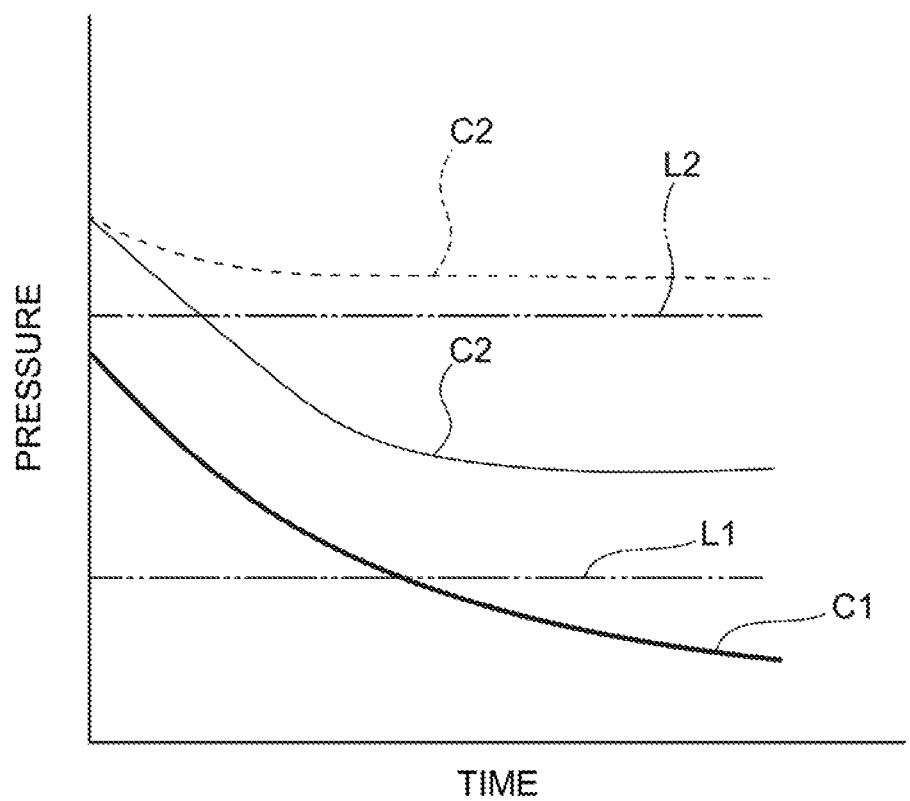
FIG. 8 is a graph showing changes in pressures of the first space and the second space that are sensed by the first pressure sensor and the second pressure sensor in the state of FIG. 4.

The pressure C1 of the first space S1 and the pressure C2 of the second space S2 that were sensed in the state of FIG. 4 are shown in FIG. 8. Here, due to pressure reduction by the pump 34, the pressure C1 of the first space S1 falls together with the passage of time. Further, the pressure C1 after two minutes is in the normal range that is lower than the first threshold value L1 that is the upper limit. Here, due to the pressure of the first space S1 being reduced, air moves via the hole 16A from the second space S3 into the first space S1, and therefore, the pressure C2 of the second space S2 falls together with the passage of time. Further, the pressure C2 after two minutes has become lower than the second threshold value L2 that is the lower limit, and is saturated at a constant pressure. This is because, when the upper limit of the pressure-reducing ability of the pump 34 is reached, air no longer moves from the second space S2 into the first space S1. In this way, the pressure C2 becomes an abnormal value that is lower than a normal case (which is the curve C2 shown by the dashed line in the drawing). Therefore, the ECU 36 judges that the hole 16A has formed in the bag-shaped member 16. Further, by the warning device 37, the ECU 36 informs the vehicle occupant that the hole 16A has formed in the bag-shaped member 16, by display or a warning sound.

(A Case in which Holes have Formed in Both the Fuel Tank and the Bag-Shaped Member)

Figure 5:
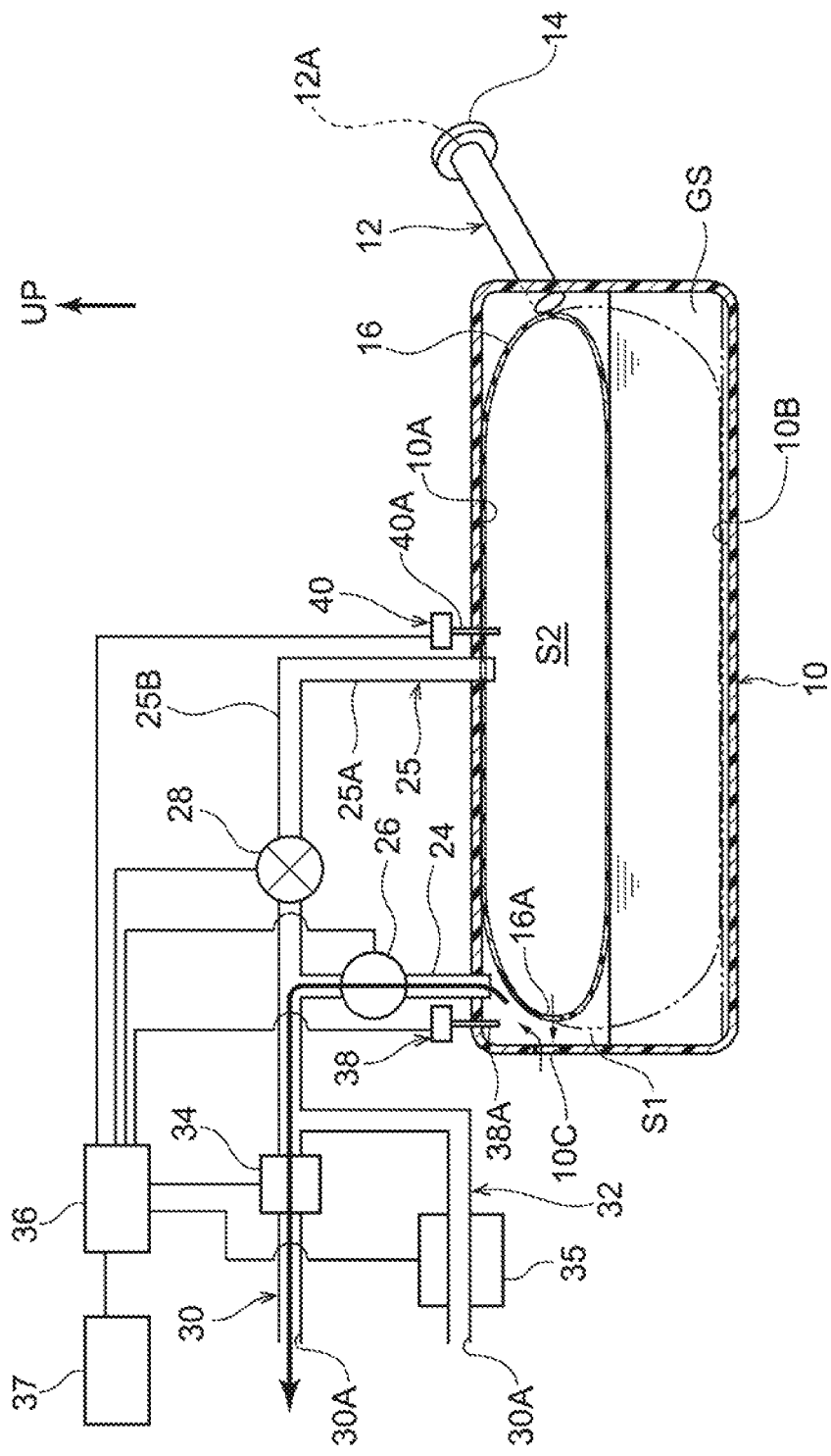
FIG. 5 is a drawing that corresponds to FIG. 1 and shows a state at the time of perforation detection in an abnormal case in which holes have formed in the fuel tank and the bag-shaped member.

A case (an abnormal case) in which holes have formed in both the fuel tank 10 and the bag-shaped member 16 is described next. As shown in FIG. 5, the hole 10C has formed in the fuel tank 10, and the hole 16A has formed in the bag-shaped member 16. Therefore, the first space S1 and the second space S2 communicate via the hole 16A, and the first space S1 and the exterior of the fuel tank 10 communicate via the hole 10C.

Here, in the same way as in the above-described processes, the ECU 36 operates the pump 34 and opens the discharge-side valve 26. Due thereto, as shown by the arrow in FIG. 5, air that is within the first space S1 passes-through the discharge pipe 24, the lateral pipe portion 25B and the pipe 30 for opening to the atmosphere, and is discharged-out into the atmosphere from the opening 30A.

Further, the ECU 36 causes the first pressure sensor 38 to sense the pressure of the first space S1, and causes the second pressure sensor 40 to sense the pressure of the second space S2. Further, after the predetermined time (two minutes) has elapsed from the start of the reducing of the pressure of the first space S1 by the pump 34, the pump 34 is stopped and the discharge-side valve 26 is closed on the basis of signals from the ECU 36.

Figure 9:
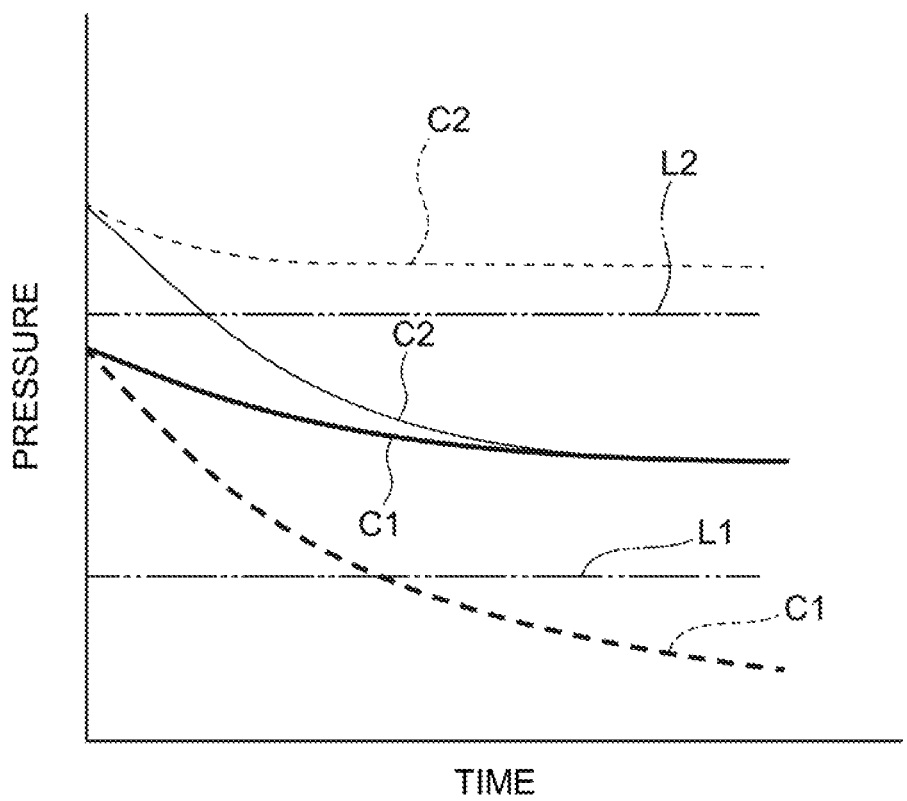
FIG. 9 is a graph showing changes in pressures of the first space and the second space that are sensed by the first pressure sensor and the second pressure sensor in the state of FIG. 5.

The pressure C1 of the first space S1 and the pressure C2 of the second space S2 that were sensed in the state of FIG. 5 are shown in FIG. 9. Here, due to pressure reduction by the pump 34, the pressure C1 of the first space S1 falls together with the passage of time. However, because air from the exterior of the fuel tank 10 flows into the first space S1 via the hole 10C, the pressure C1 is maintained at a pressure that is higher than a normal case (which is the curve C1 shown by the dashed line in the drawing). Namely, there is saturation at a pressure at which the pressure-reducing ability of the pump 34 and the amount of air that flows-into the first space S1 are in equilibrium, and the pressure no longer falls thereafter. Further, the pressure C1 after two minutes is an abnormal value that is higher than the threshold value L1 that is the upper limit. Therefore, the ECU 36 judges that the hole 10C has formed in the fuel tank 10.

Further, due to the pressure of the first space S1 being reduced, air moves via the hole 16A from the second space S2 into the first space S1, and therefore, the pressure C2 of the second space S2 falls together with the passage of time. Further, the pressure C2 after two minutes has become lower than the second threshold value L2 that is the lower limit, and is saturated at a constant pressure. The pressure C2 becomes an abnormal value that is lower than a normal case (which is the curve C2 shown by the dashed line in the drawing). Therefore, the ECU 36 judges that the hole 16A has formed in the bag-shaped member 16 as well. Further, by the warning device 37, the ECU 36 informs the vehicle occupant that holes have formed in the fuel tank 10 and the bag-shaped member 16, by display or a warning sound.

Operation of the fuel tank structure relating to the present embodiment is described next.

In the present embodiment, the bag-shaped member 16 is inflated or contracted in accordance with the height of the liquid surface of the fuel GS that is accommodated in the fuel tank 10, and the state of contact of the bag-shaped member 16 and the liquid surface of the fuel GS is thereby maintained. Due thereto, the liquid surface of the fuel GS can be covered by the bag-shaped member 16 regardless of the height of the liquid surface of the fuel GS. As a result, the generation of evaporated fuel can be suppressed.

Further, the present embodiment is provided with the pump 34 that reduces the pressure of the first space S1, the first pressure sensor 38 that senses the pressure of the first space S1, and the second pressure sensor 40 that senses the pressure of the second space S2. Further, as described above, perforation of the fuel tank 10 and the bag-shaped member 16 can be detected on the basis of the pressure of the first space S1 and the pressure of the second space S2 that are after a predetermined time has elapsed from the start of the reduction in pressure of the first space S1 by the pump 34.

Moreover, the present embodiment has the warning device 37, and, by this warning device 37, the vehicle occupant can be informed in which of the fuel tank 10 and the bag-shaped member 16 a hole has formed. Due thereto, for example, in a case in which a warning is given that an hole has formed only the fuel tank 10, there is no need to confirm the state of the bag-shaped member 16 that is at the interior of the fuel tank 10. Further, conversely, in a case in which a warning is given that a hole has formed only at the bag-shaped member 16, there is no need to confirm the state of the fuel tank 10 main body. As a result, the vehicle occupant can easily specify the place where a hole has formed.

Although an embodiment of the present disclosure has been described above, the present disclosure is not limited to the above-described structure and can, of course, be implemented in various forms other than the above-described structure within a scope that does not depart from the gist thereof. For example, in the present embodiment, perforation is judged by sensing the pressure of the first space S1 and the pressure of the second space S2 that are two minutes after the start of the reducing of the pressure of the first space S1 by the pump 34. However, the present disclosure is not limited to this. Namely, the time (the pressure-reduction time), that is from the start of the reducing of the pressure of the first space S1 until the pressure of the first space S1 and the pressure of the second space S2 are obtained, may be changed appropriately. For example, the pressure-reduction time may be set to be long so as to be able to reliably detect perforation even in cases in which a hole is small.

Further, the present embodiment is structured such that the vehicle occupant is notified whether a hole has formed in the fuel tank 10 or whether a hole has formed in the bag-shaped member 16, by a warning from the warning device 37. However, the present disclosure is not limited to this. For example, there may be a structure in which, in a case in which a hole has formed in at least one of the fuel tank 10 and the bag-shaped member 16, the vehicle occupant is notified, by a warning sound or the like, of the fact that the fuel tank 10 is in an abnormal state.

Moreover, it suffices for the pump 34 to be a pump that can discharge the gas that is within the first space S1, and the type of the pump is not particularly limited. For example, a vacuum pump with a filter, that can trap evaporated fuel, or the like may be used.

What is claimed is:

1. A fuel tank structure comprising:
   a fuel tank that is installed in an automobile and that is configured to accommodate fuel;
   a bag-shaped member that is fixed to a ceiling portion of an interior of the fuel tank, and that partitions a space within the fuel tank into a first space at an outer side of the bag-shaped member and a second space at an inner side of the bag-shaped member, and that, by inflating or contracting in accordance with a height of a liquid surface of fuel accommodated in the fuel tank, maintains a state of contact with the fuel;
   a first pressure sensor that senses a pressure of the first space;
   a second pressure sensor that senses a pressure of the second space;
   a pump that reduces the pressure of the first space; and
   an electronic control unit that operates the pump, and acquires the pressure of the first space sensed by the first pressure sensor and the pressure of the second space sensed by the second pressure sensor after a predetermined time has elapsed from operation of the pump, and, in a case in which the pressure of the first space is higher than a first threshold value, judges that a hole has formed in the fuel tank, and, in a case in which the pressure of the second space is lower than a second threshold value, judges that a hole has formed in the bag-shaped member.

2. The fuel tank structure of claim 1, further comprising a warning device that warns a vehicle occupant that the hole has formed in at least one of the fuel tank and the bag-shaped member,
   wherein, in a case in which the pressure of the first space is higher than the first threshold value, the electronic control unit causes the warning device to warn the vehicle occupant that the hole has formed in the fuel tank, and, in a case in which the pressure of the second space is lower than the second threshold value, the electronic control unit causes the warning device to warn the vehicle occupant that the hole has formed in the bag-shaped member.

* * * * *